(12) United States Patent
Ogura et al.

(10) Patent No.: US 9,752,940 B2
(45) Date of Patent: Sep. 5, 2017

(54) PRESSURE SENSING ELEMENT COMPRISING ELECTRODE INCLUDING PROTRUSION HAVING ELASTICITY

(71) Applicant: Panasonic Intellectual Property Management Co., Ltd., Osaka (JP)

(72) Inventors: Tetsuyoshi Ogura, Osaka (JP); Keiji Noine, Osaka (JP); Kenichi Ezaki, Osaka (JP); Shinobu Masuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/962,958

(22) Filed: Dec. 8, 2015

(65) Prior Publication Data

US 2016/0178460 A1    Jun. 23, 2016

(30) Foreign Application Priority Data

Dec. 22, 2014    (JP) ................. 2014-259119

(51) Int. Cl.
*G01L 1/14*    (2006.01)
*G01L 9/00*    (2006.01)

(52) U.S. Cl.
CPC ............ *G01L 1/142* (2013.01); *G01L 9/0072* (2013.01)

(58) Field of Classification Search
CPC ......... G01L 1/14; G01L 1/142; G01L 9/0072; G01L 9/06; G01H 1/055; G01H 3/14; G01H 3/00

USPC ..................................................... 73/862.626
See application file for complete search history.

(56) References Cited

U.S. PATENT DOCUMENTS

| | | | | |
|---|---|---|---|---|
| 4,827,763 A * | 5/1989 | Bourland | ............. | A61B 5/6892 361/283.1 |
| 4,852,443 A * | 8/1989 | Duncan | ................ | G10H 1/0551 200/600 |
| 4,986,136 A * | 1/1991 | Brunner | ................... | G01L 1/146 361/278 |
| 6,006,386 A * | 12/1999 | Mohaupt | ................. | G01L 1/142 73/862.68 |

(Continued)

FOREIGN PATENT DOCUMENTS

| JP | 1-092632 | 4/1989 |
|---|---|---|
| JP | 9-043081 | 2/1997 |
| JP | 2007-315875 | 12/2007 |

(Continued)

*Primary Examiner* — Lisa Caputo
*Assistant Examiner* — Octavia Hollington
(74) *Attorney, Agent, or Firm* — McDermott Will & Emery LLP

(57) ABSTRACT

A pressure sensing element of an aspect of the present disclosure includes a first electrode including at least one protrusion having elasticity; a second electrode facing the at least one protrusion; and a dielectric disposed between the first electrode and the second electrode and including a first dielectric and a second dielectric. The first dielectric is disposed between a top of the at least one protrusion and the second electrode, and is in contact with each of the top of the at least one protrusion and the second electrode. The second dielectric is disposed between a first portion of the first electrode, the first portion not including the at least one protrusion, and the first dielectric.

15 Claims, 12 Drawing Sheets

(56) References Cited

U.S. PATENT DOCUMENTS 7,719,007 B2 * 5/2010 Tompkins ............... G01L 1/142
                                                                             257/48
8,434,369 B2 * 5/2013 Hou ......................... G01L 1/18
                                                                             361/600

FOREIGN PATENT DOCUMENTS

| JP | 2012-026906 | 2/2012 |
| JP | 2014-142193 | 8/2014 |

* cited by examiner

CONTACT AREA BETWEEN
FIRST DIELECTRIC AND
SECOND DIELECTRIC

CONTACT AREA BETWEEN
PROTRUSION AND
FIRST DIELECTRIC

PRESSURE SENSING ELEMENT COMPRISING ELECTRODE INCLUDING PROTRUSION HAVING ELASTICITY

BACKGROUND

1. Technical Field

The present disclosure relates to a pressure sensing element, more particularly to a pressure sensing element applicable to various electrical devices.

2. Description of the Related Art

Electrical devices such as a smartphone and a car navigation system have been rapidly developed to have higher performances and a wider variety. This requires a pressure sensing element, which is a component of the electrical device, to have reliable operation performance. The pressure sensing element is made of a conductive elastic material, for example, and is a sensor that performs detection upon application of an external load. The pressure sensing element is used as a sensor element in various electrical devices. Japanese Unexamined Patent Application Publication (Translation of PCT Application) No. 1-92632 and Japanese Unexamined Patent Application Publication No. 2014-142193, for example, each disclose a technique relating to such an element.

SUMMARY

In one general aspect, the techniques disclosed here feature a pressure sensing element including: a first electrode including at least one protrusion having elasticity; a second electrode facing the at least one protrusion; and a dielectric disposed between the first electrode and the second electrode and including a first dielectric and a second dielectric, wherein the first dielectric is disposed between a top of the at least one protrusion and the second electrode, and is in contact with each of the top of the at least one protrusion and the second electrode, and the second dielectric is disposed between a first portion of the first electrode, the first portion not including the at least one protrusion, and the first dielectric.

According to the present disclosure, a pressure sensing element having a simple structure, but relatively high linearity is obtained. Specifically, the pressure sensing element has a capacitance including two kinds of capacitances having different characteristics. This enables the pressure sensing element of the present disclosure to have a relatively simple structure, but relatively high linearity. In other words, according to the present disclosure, a pressure sensing element is able to have appropriately controlled linearity in each of a low-load application section and a high-load application section without having a complex structure.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
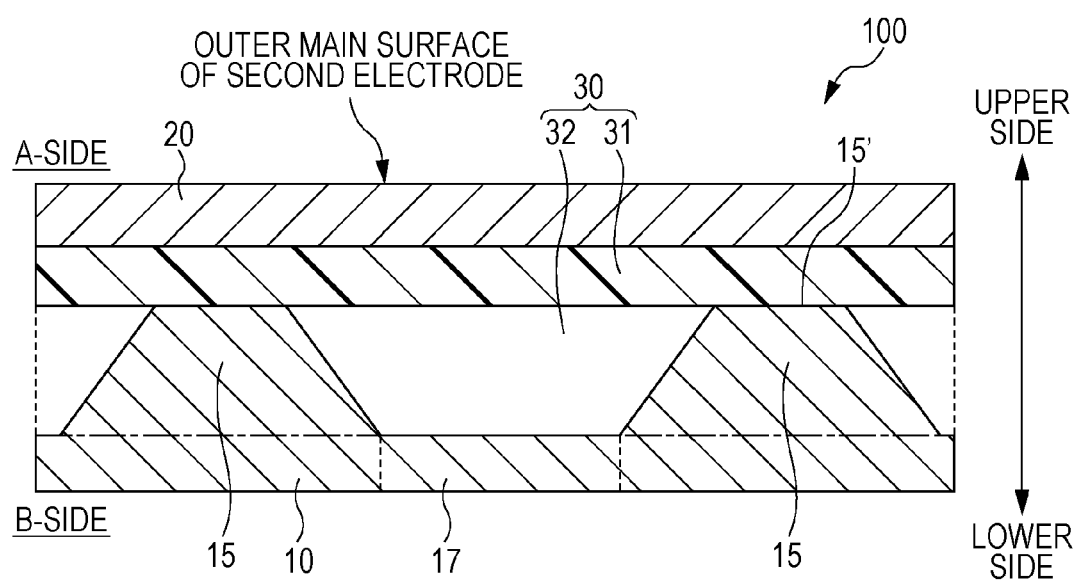
FIG. 1 is a cross-sectional view schematically illustrating a configuration of a pressure sensing element of the present disclosure.

Inventors of the present disclosure conducted a comprehensive study and found that pressure sensing elements need to be further improved. Specifically, the inventors recognized a need for improvement in control of linearity in pressure sensing elements used as capacitance type pressure sensors. In such a pressure sensing element, a contact area between an elastic electrode and a dielectric layer increases when the elastic electrode is deformed by application of a load. This causes a change in capacitance of the pressure sensing element, enabling detection of the load. The capacitance of the pressure sensing element increases only according to an increase in the contact area. However, the load necessary for the deformation of the elastic electrode increases according to an increase in a deformation amount of the elastic electrode and the increase in the contact area, i.e., two parameters. Thus, the change in the capacitance is large in a low-load application section and is small in a high-load application section, which requires the pressure sensing element to have a complex structure (such as a structure including a protruding elastic electrode having a complex shape, for example) for control of the linearity.

A pressure sensing element according to one aspect of the present disclosure has a simple structure and relatively high linearity. The aspect of the present disclosure is briefly described below.

First Feature

A pressure sensing element according to an aspect of the present disclosure includes: a first electrode including at least one protrusion having elasticity; a second electrode facing the at least one protrusion; and a dielectric disposed between the first electrode and the second electrode and including a first dielectric and a second dielectric, wherein the first dielectric is disposed between a top of the at least one protrusion and the second electrode, and is in contact with each of the top of the at least one protrusion and the second electrode, and the second dielectric is disposed between a first portion of the first electrode, the first portion not including the at least one protrusion, and the first dielectric.

Second Feature

In the pressure sensing element according to the first feature, the pressure sensing element may have a capacitance including a first capacitance and a second capacitance, the first capacitance is a capacitance of a first capacitor including a contact area between the at least one protrusion and the first dielectric, and the second capacitance is a capacitance of a second capacitor including a contact area between the first dielectric and the second dielectric.

Third Feature

In the pressure sensing element according to the second feature, a capacitance characteristic of the capacitance of the pressure sensing element may have higher linearity than a capacitance characteristic of each of the first capacitance and the second capacitance.

Fourth Feature

In the pressure sensing element according to the second feature or the third feature, the first capacitor may include the at least one protrusion, a first section of the second electrode facing the at least one protrusion, and a first section of the first dielectric positioned between the at least one protrusion and the first section of the second electrode, and the second capacitor may include the first portion of the first electrode, a second section of the second electrode facing the first portion of the first electrode, a second section of the first dielectric positioned between the first portion of the first electrode and the second section of the second electrode, and the second dielectric.

Fifth Feature

In the pressure sensing element according to any one of the first feature to the fourth feature, the at least one protrusion may have a tapered shape in which a width of the tapered shape gradually decreases toward the second electrode.

Sixth Feature

In the pressure sensing element according to any one of the first feature to the fifth feature, the at least one protrusion and the second dielectric may be configured such that the second dielectric deforms when the at least one protrusion deforms.

Seventh Feature

In the pressure sensing element according to any one of the first feature to the sixth feature, the second electrode may have a first main surface facing the first electrode and a second main surface opposite the first main surface, and a load may be applied to the second main surface.

Eighth Feature

In the pressure sensing element according to the seventh feature, the at least one protrusion may be configured such that a contact area between the at least one protrusion and the first dielectric increases due to deformation of the at least one protrusion caused by the application of the load to the second main surface.

Ninth Feature

In the pressure sensing element according to the seventh feature or the eighth feature, the at least one protrusion may be configured such that a thickness of the second dielectric decreases due to deformation of the second dielectric caused by the application of the load to the second main surface.

Tenth Feature

In the pressure sensing element according to any one of the first feature to the ninth feature, the first dielectric may have elasticity.

Eleventh Feature

In the pressure sensing element according to the seventh feature, the at least one protrusion and the first dielectric may be configured such that the at least one protrusion and the first dielectric are both deformed when the load is applied to the second main surface.

Twelfth Feature

In the pressure sensing element according to any one of the first to the eleventh feature, the first dielectric may have a higher elastic modulus than the at least one protrusion.

Thirteenth Feature

In the pressure sensing element according to any one of the first feature to the twelfth feature, at least one selected from the group consisting of the first electrode, the second electrode, the first dielectric, and the second dielectric may have light transmissivity.

Fourteenth Feature

The pressure sensing element according to any one of the seventh feature to the ninth feature may further include a supporting member and a pressing member, wherein the first electrode may have a third main surface facing the second electrode and a fourth main surface opposite the third main surface, the supporting member may be in contact with the fourth main surface, and the pressing member may be in contact with the second main surface Fifteenth Feature The pressure sensing element according to any one of the first feature to the fourteenth feature may further include a spacer disposed between the first electrode and the second electrode.

First Embodiment

Hereinafter, a pressure sensing element according to one aspect of the present disclosure is described with reference to the drawings. Components in the drawings are schematically illustrated only for ease of understanding of the present disclosure and the dimensional ratio and appearance of the components in the drawings may be different from those of actual components. A vertical direction used directly or indirectly herein corresponds to a vertical direction in the drawings.

FIG. 1 schematically illustrates a configuration of a pressure sensing element 100 of the present disclosure. The pressure sensing element 100 includes a first electrode 10, a second electrode 20, and a dielectric 30.

The first electrode 10 includes at least one protrusion 15 having elasticity. Hereinafter, the protrusion 15 may be referred to as an elastic protrusion 15. The second electrode 20 and the first electrode 10 face each other. The second electrode 20 may be a layered electrode. The second electrode 20 faces the first electrode 10 such that the elastic protrusion 15 is sandwiched between the second electrode 20 and the first electrode 10. The whole of the dielectric 30 is disposed between the first electrode 10 and the second electrode 20.

The dielectric 30 of the pressure sensing element 100 includes two dielectrics including a first dielectric 31 and a second dielectric 32. As illustrated in FIG. 1, the first dielectric 31 and the second dielectric 32 are adjacent to each other (i.e., the first dielectric 31 and the second dielectric 32 overlap with each other and are in contact with each other). Particularly, the first dielectric 31 and the second dielectric 32 are adjacent to or overlap with each other in a facing direction of the first electrode 10 and the second electrode 20 (vertical direction in FIG. 1). The first dielectric 31 is in contact with each of a top 15' of the elastic protrusion 15 of the first electrode 10 and the second electrode 20 so as to be positioned therebetween. In other words, the first dielectric 31 is sandwiched between the top 15' of the elastic protrusion 15 and the second electrode 20. The second dielectric 32 is positioned in a concave portion of the first electrode 10 defined by the elastic protrusions 15. The second dielectric 32 is positioned between the elastic protrusions 15 adjacent to each other. In other words, the second dielectric 32 is positioned in a space defined by an upper surface of a protrusion-free portion 17 of the first electrode 10, which does not include the elastic protrusion 15, and side surfaces of the elastic protrusions 15 as illustrated in FIG. 1.

Figure 2A:
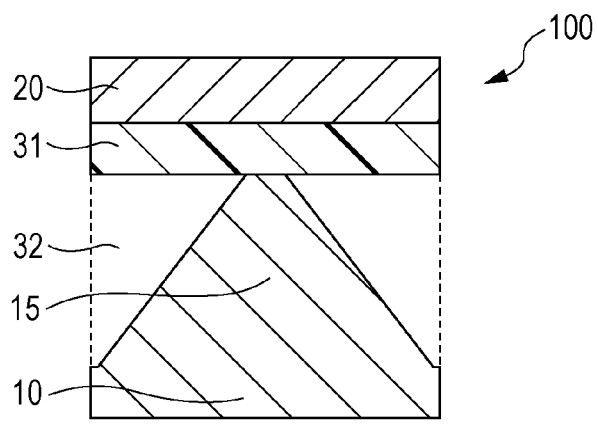
FIG. 2A is a cross-sectional view schematically illustrating a state of the pressure sensing element before application of a load to the pressure sensing element.
Figure 2B:
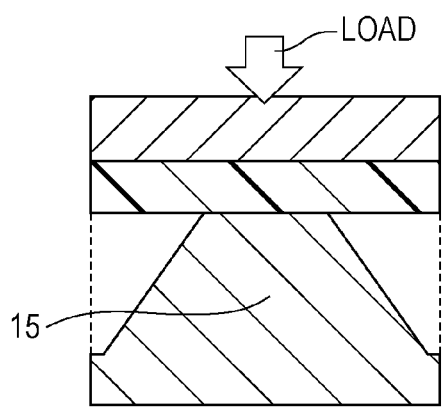
FIG. 2B and FIG. 2C are cross-sectional views each schematically illustrating how the state of the pressure sensing element changes with passage of time during application of a load to the pressure sensing element.
Figure 2C:
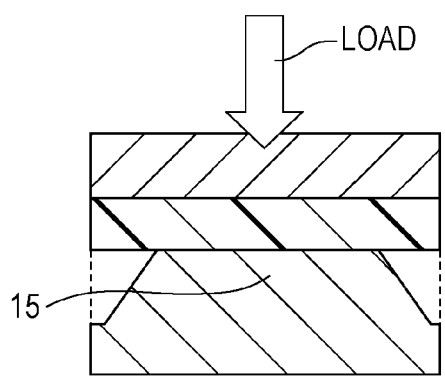

The pressure sensing element 100 of the present disclosure is an element having a capacitance and functions as a capacitor. A change in a capacitance of the pressure sensing element 100 is caused when a load is applied thereto. The change in the capacitance enables the load to be detected. As illustrated in FIG. 2B and FIG. 2C, for example, the elastic protrusion 15 deforms when a load is applied to the pressure sensing element 100. This causes a change in the capacitance, enabling the detection of the load. Thus, the pressure sensing element 100 of the present disclosure may be referred to as a capacitance type pressure sensing element, a capacitive pressure sensor element, or a pressure sensing switch element.

The pressure sensing element 100 has a capacitance including two kinds of capacitances having different characteristics, and thus exhibits relatively high linearity. In other words, the capacitance of the pressure sensing element 100 is a combination of a first capacitance and a second capacitance, which are different kinds of sub-capacitances.

The pressure sensing element 100 of the present disclosure detects each of the first capacitance and the second capacitance for sensing.

Figure 3:
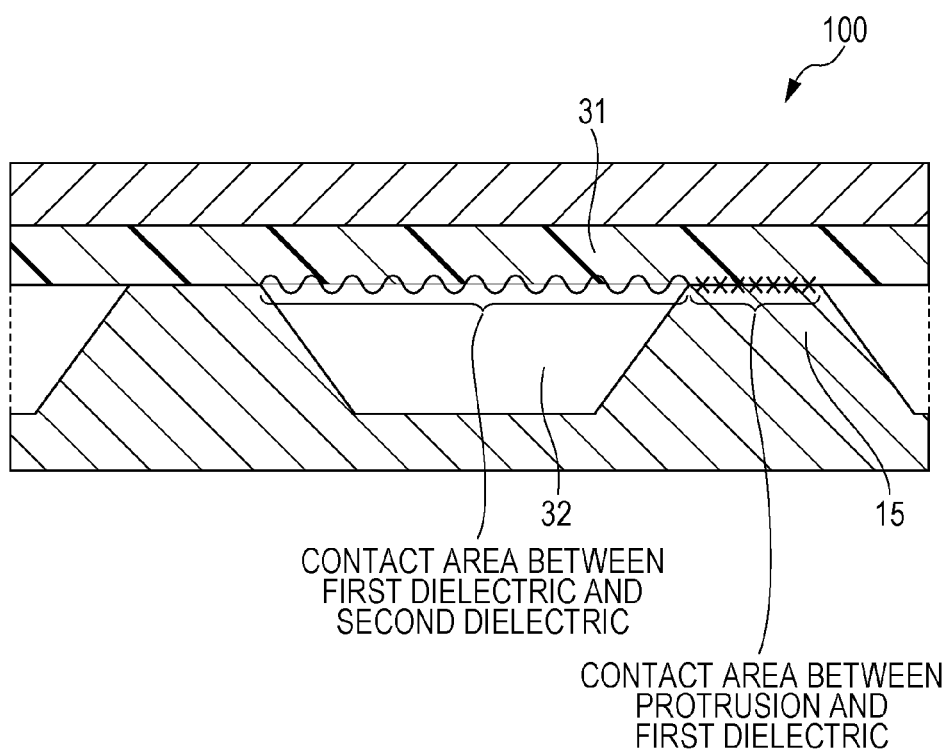
FIG. 3 is a cross-sectional view indicating a contact area between an elastic protrusion and a first dielectric and a non-contact area between the elastic protrusion and the first dielectric.

Specifically, as illustrated in FIG. 3, the first capacitance is a capacitance of a first capacitor including a contact area between the elastic protrusion 15 and the first dielectric 31. In other words, the first capacitance corresponds to the capacitance of the first capacitor including the contact area between the top 15' (top surface, for example) of the elastic protrusion 15 and a main surface of the first dielectric 31 as illustrated in FIG. 3. The second capacitance is a capacitance of the second capacitor including a non-contact area, in which the elastic protrusion 15 and the first dielectric 31 are not in contact with each other. The second capacitor corresponds to the capacitance of the second capacitor, which does not include the contact area between the top 15' (top surface, for example) of the elastic protrusion 15 and the main surface of the first dielectric 31, as illustrated in FIG. 3. The second capacitance is the capacitance of the second capacitor including a contact area between the second dielectric 32 and the first dielectric 31 as illustrated in FIG. 3.

Figure 4A:
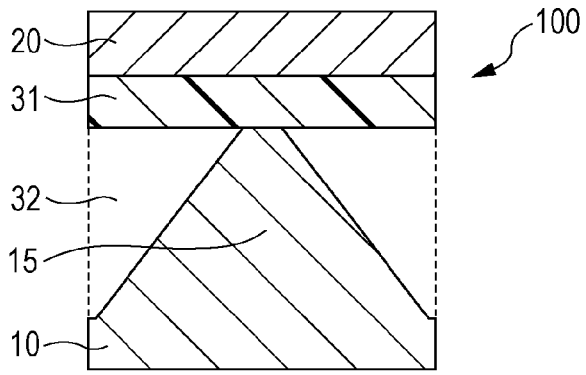
FIG. 4A is a cross-sectional view schematically illustrating a first capacitor of the pressure sensing element.
Figure 4B:
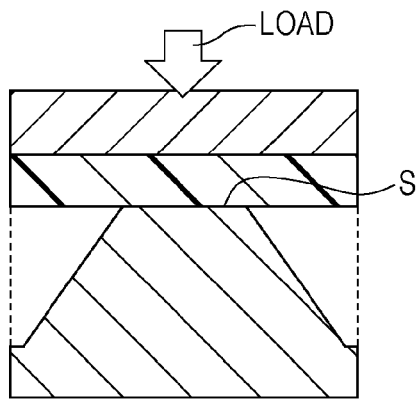
FIG. 4B is a cross-sectional view schematically illustrating a state of the first capacitor during application of a load to the pressure sensing element.
Figure 4C:
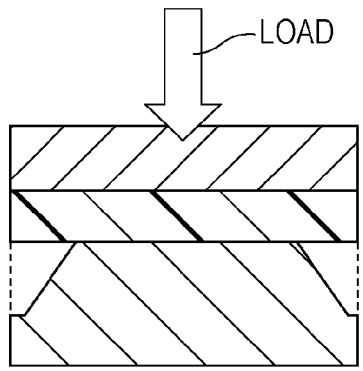
FIG. 4C is a cross-sectional view schematically illustrating a state of the first capacitor during application of a larger load to the pressure sensing element.
Figure 4D:
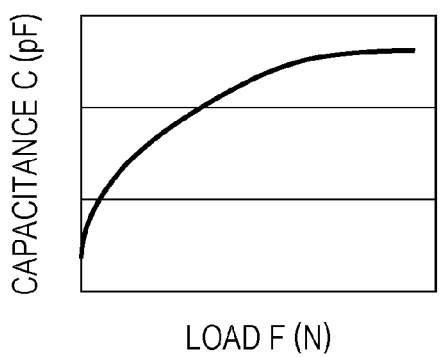
FIG. 4D is a diagram indicating a capacitance change characteristic of the first capacitor during application of pressure.

The first capacitance and the second capacitance are described in detail. FIG. 4A is a cross-sectional view schematically illustrating the first capacitor of the pressure sensing element 100. FIG. 4B is a cross-sectional view schematically illustrating a state of the first capacitor during application of a load to the pressure sensing element 100. FIG. 4C is a cross-sectional view schematically illustrating a state of the first capacitor during application of a larger load to the pressure sensing element 100. FIG. 4D is a diagram indicating a capacitance change characteristic of the first capacitor during application of pressure. Herein, a capacitance C [pF] of the first capacitor and a load F [N] applied to the pressure sensing element 100 are expressed by the following equations, respectively:

$$C = \frac{\varepsilon S}{d}$$

$$F = E \cdot eS$$

where $\in$ [pF/m] represents a dielectric constant of the dielectric, S [m$^2$] represents a contact area between the elastic protrusion and the first dielectric, d [m] represents a thickness of the first dielectric, E [Pa] is Young's modulus, and e represents distortion.

In the present disclosure, the first capacitance has a characteristic in which the load increases more readily than the capacitance. As indicated in FIG. 4D, in the first capacitor, an increase rate of the capacitance C decreases as the load applied to the pressure sensing element increases. The capacitance C varies according to one variable parameter, i.e., the area S (contact area between the elastic protrusion 15 and the first dielectric 31). The load F varies according to two variable parameters, i.e., the area S and the distortion e (deformation amount of the elastic protrusion 15). Thus, the first capacitor has a characteristic in which the load increases more readily than the capacitance during application of the load to the pressure sensing element 100. As a result, the increase rate of the capacitance C tends to decrease as the applied load F increases. Specifically, as indicated by the graph in FIG. 4D, the increase rate of the capacitance C is relatively high in a low-load application section and the increase rate of the capacitance C is relatively low in a high-load application section.

Figure 5A:
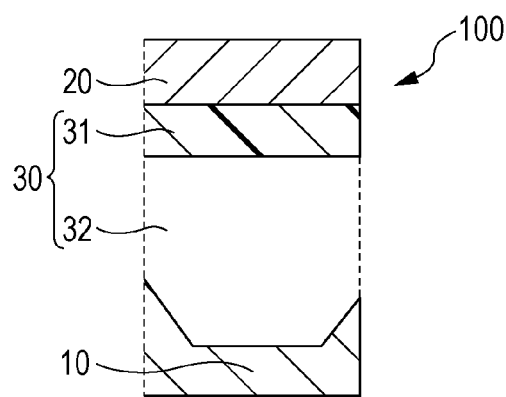
FIG. 5A is a cross-sectional view schematically illustrating a second capacitor of the pressure sensing element.
Figure 5B:
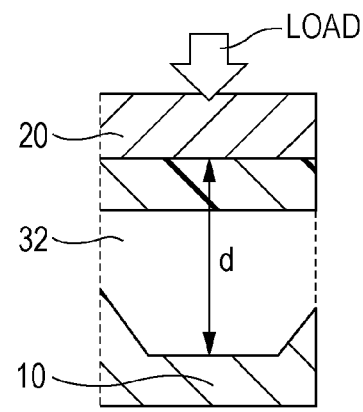
FIG. 5B is a cross-sectional view schematically illustrating a state of the second capacitor during application of a load to the pressure sensing element.
Figure 5C:
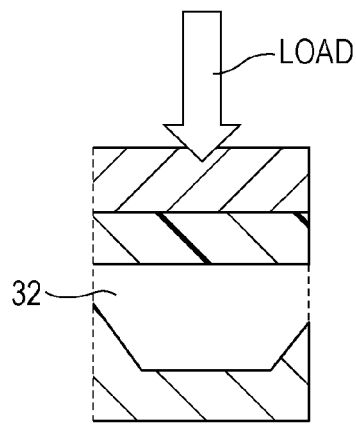
FIG. 5C is a cross-sectional view schematically illustrating a state of the second capacitor during application of a larger load to the pressure sensing element.
Figure 5D:
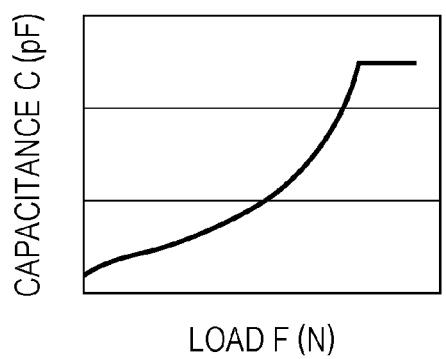
FIG. 5D is a diagram schematically indicating a capacitance change characteristic of the second capacitor during application of pressure.

FIG. 5A is a cross-sectional view schematically illustrating the second capacitor of the pressure sensing element 100. FIG. 5B is a cross-sectional view schematically illustrating a state of the second capacitor during application of a load to the pressure sensing element 100. FIG. 5C is a cross-sectional view schematically illustrating a state of the second capacitor during application of a larger load to the pressure sensing element 100. FIG. 5D is a diagram schematically indicating a capacitance change characteristic of the second capacitor during application of pressure. Herein, a capacitance C [pF] of the second capacitor is expressed by the following equation:

$$C = \frac{\varepsilon S}{d}$$

where $\varepsilon$[pF/m] represents a dielectric constant of the dielectric, S [m$^2$] represents a contact area between the electrode and the dielectric, and d [m] represents the thickness of the dielectric.

As illustrated in FIG. 5D, in the second capacitor of the present disclosure, an increase rate of the capacitance C increases as the load applied to the pressure sensing element 100 increases. The capacitance C of the second capacitor is inversely proportional to the thickness d of the dielectric (particularly, the thickness of the second dielectric 32), which is a variable parameter. This has a large influence, and thus the increase rate of the capacitance C tends to increase as the applied load F increases. Specifically, as indicated by the graph in FIG. 5D, the increase rate of the capacitance C is relatively low in the low-load application section and the increase rate of the capacitance C is relatively high in the high-load application section.

Figure 6A:
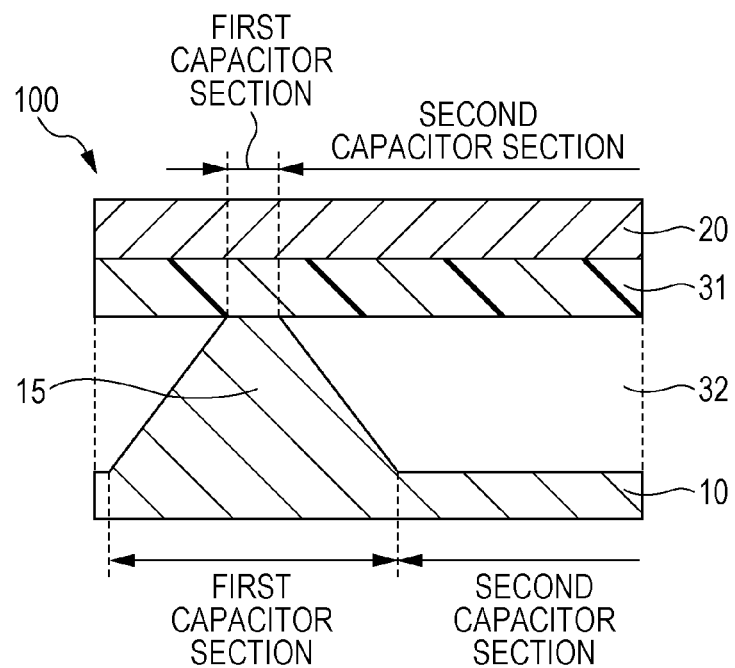
FIG. 6A is a cross-sectional view illustrating an area of the first capacitor and an area of the second capacitor.
Figure 6B:
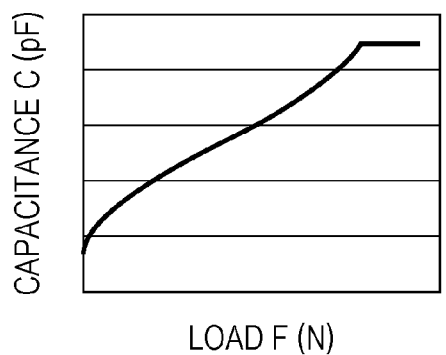
FIG. 6B is a diagram schematically indicating a capacitance change characteristic of the pressure sensing element during application of pressure.

FIG. 6A is a cross-sectional view illustrating an area of the first capacitor and an area of the second capacitor in the pressure sensing element 100. FIG. 6B is a diagram schematically indicating a capacitance change characteristic of the pressure sensing element 100 during application of pressure. The capacitance of the pressure sensing element 100 of the present disclosure includes the first capacitance and the second capacitance having different capacitance characteristics. This enables the pressure sensing element 100 to have high linearity as indicated in FIG. 6B. Specifically, a ratio of the first capacitance to the second capacitance is adjusted to control sensitivity in the low-load application section and the high-load application section, so that the pressure sensing element 100 has high linearity. More specifically, the relationship of the correlation between the load and the first capacitance of the first capacitor and the correlation between the load and the second capacitance of the second capacitor is appropriately adjusted to control the sensitivity in the low-load application section and the high-load application section, so that the pressure sensing element 100 has high linearity. The characteristic of the first capacitor, in which the increase rate of the capacitance C decreases as the applied load F increases, may be stronger than the characteristic of the second capacitor, in which the increase rate of the capacitance C increases as the applied load F increases. In such a case, the capacitance is adjusted to have a lower ratio of the first capacitance to the second capacitance, or conversely, the capacitance is adjusted to have a higher ratio of the second capacitance to the first capacitance. This generally enables the pressure sensing element 100 to have high linearity. Similarly, the characteristic of the first capacitor, in which the increases rate of the capacitance C decreases as the applied load F increases, may be weaker than the characteristic of the second capacitor, in which the increase rate of the capacitance C increases as the applied load F increases. In such a case, the capacitance is adjusted to have a higher ratio of the first capacitance to the second capacitance, or conversely, the capacitance is adjusted to have a lower ratio of the second capacitance to the first capacitance. This generally enables the pressure sensing element 100 to have high linearity.

The ratio of the first capacitance to the second capacitance may be adjusted such that the characteristic of the first capacitor (correlation between the load and the first capacitance) becomes stronger than the characteristic of the second capacitor (correlation between the load and the second capacitance). In such a case, the pressure sensing element 100 has high sensitivity in the low-load application section and has low sensitivity in the high-load application section. The ratio of the first capacitance to the second capacitance may also be adjusted such that the characteristic of the second capacitor (correlation between the load and the second capacitance) becomes stronger than the characteristic of the first capacitor (correlation between the load and the first capacitance). In such a case, the pressure sensing element 100 has low sensitivity in the low-load application section and has high sensitivity in the high-load application section.

The graph in FIG. 6B indicates that the capacitance characteristic (correlation between the load and the capacitance) of the pressure sensing element 100 has high linearity. The capacitance characteristic of the pressure sensing element 100 has higher linearity than each of the capacitance characteristic (correlation between the load and the first capacitance) of the first capacitor and the capacitance characteristic (correlation between the load and the second capacitance) of the second capacitor. In other words, the pressure sensing element 100 as a whole has higher linearity in the correlation between the load applied to the pressure sensing element 100 and the capacitance than each of the first capacitor and the second capacitor.

Figure 7:
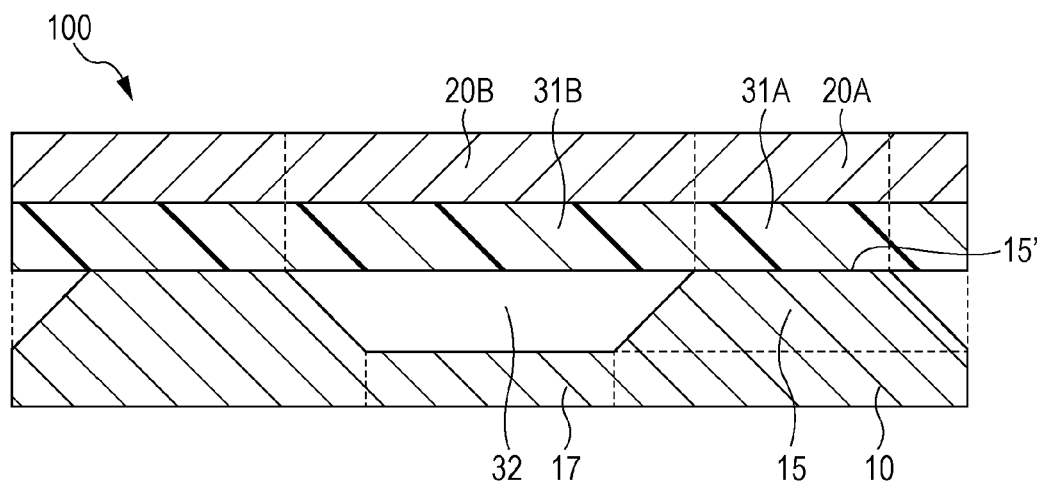
FIG. 7 is a cross-sectional view of the pressure sensing element and indicates components of the first capacitor and the second capacitor.

The first capacitor and the second capacitor are described in detail. The first capacitor includes the elastic protrusion 15. In other words, the first capacitor is a capacitor including the contact surface between the top 15' of the elastic protrusion 15 and the main surface of the first dielectric 31. Specifically, as illustrated in FIG. 7, the first capacitor includes the elastic protrusion 15 of the first electrode 10, a first section 20A of the second electrode 20 facing the elastic protrusion 15, and a first section 31A of the first dielectric 31 positioned between the elastic protrusion 15 and the first section 20A. The second capacitor does not include the elastic protrusion 15. In other words, the second capacitor includes a non-contact area, in which the elastic protrusion 15 and the first dielectric 31 are not in contact with each other. The second capacitor is a capacitor, which does not include the contact area between the top 15' of the elastic protrusion 15 and the main surface of the first dielectric 31. Specifically, as illustrated in FIG. 7, the second capacitor includes the protrusion-free portion 17 of the first electrode 10, which does not include the elastic protrusion 15, a second section 20B of the second electrode 20 facing the protrusion-free portion 17, and a second section 31B of the first dielectric 31, and the second dielectric 32, which are positioned between the protrusion-free portion 17 and the second section 20B of the second electrode 20.

Figure 8:
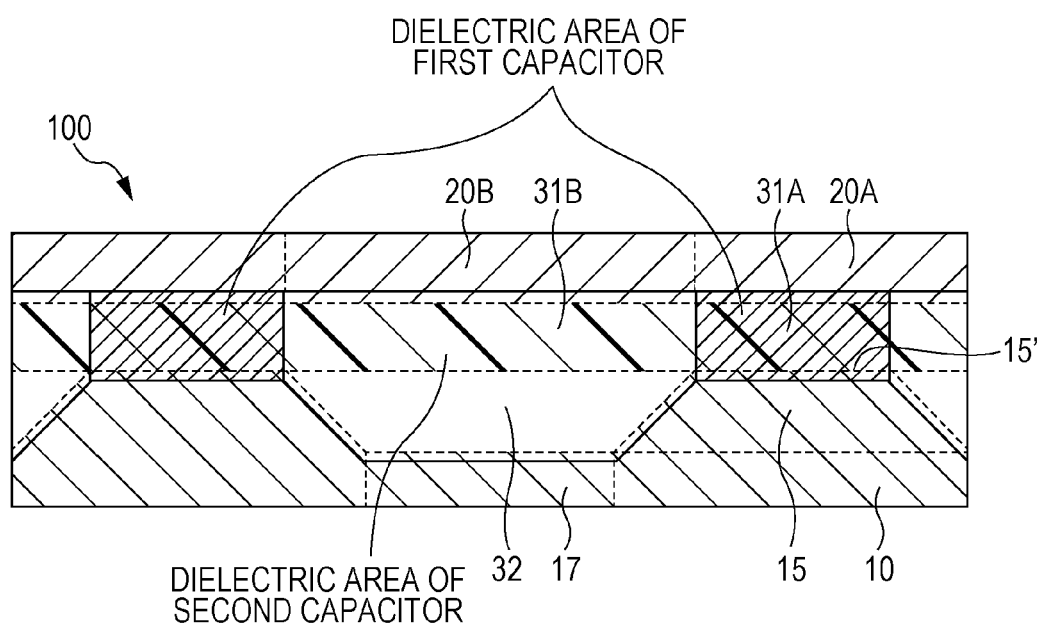
FIG. 8 is a cross-sectional view of the pressure sensing element and indicates a dielectric area of the first capacitor and a dielectric area of the second capacitor.

FIG. 8 schematically illustrates a dielectric area of each of the first capacitor and the second capacitor. As can be seen from the view, the first capacitor stores an electrical charge in an element area including a portion of the elastic protrusion 15 of the first electrode 10, a portion of the first section 20A of the second electrode 20, and a dielectric area between the top 15' and the first section 20A. The second capacitor stores an electrical charge in an element area including a portion of the protrusion-free portion 17 of the first electrode 10, a portion of the second section 20B of the second electrode 20, and a dielectric area between the protrusion-free portion 17 and the second section 20B.

The pressure sensing element 100 of the present disclosure includes the first capacitor and the second capacitor having different configurations. This enables the pressure sensing element 100 as a whole to have high linearity in the capacitance change characteristic during application of a load.

Hereinafter, components of the pressure sensing element 100 of the present disclosure are described in detail. Specifically, the first electrode 10, the second electrode 20, the dielectric 30, and other components, which constitute the pressure sensing element 100, are described.

The first electrode 10 is an electrode including the at least one elastic protrusion 15. The elastic protrusion 15 has elasticity (i.e., the elastic protrusion 15 changes its shape when external force is applied thereto and returns to its original shape when the external force is released). The first electrode 10 may be referred to as an elastic electrode. The first electrode 10 may include any material that provides both elasticity (particularly to the elastic protrusion 15) and conductive property. The first electrode 10 may be made of a resin structure and a conductive filler dispersed in the resin structure. The resin structure may include at least one resin material selected from the group consisting of a styrenic resin, a silicone resin (such as dimethylpolysiloxane (PDMS)), an acrylic resin, a rotaxane resin, and a urethane resin, for example. The conductive filler may include at least one material selected from the group consisting of gold (Au), silver (Ag), copper (Cu), carbon (C), zinc oxide (ZnO), indium (III) oxide ($In_2O_3$), and tin (IV) oxide ($SnO_2$), for example. Instead of or in addition to the conductive filler, the first electrode 10 may include a conductive layer. Specifically, a conductive ink may be applied to the surface of the resin structure to form the first electrode 10 including the conductive layer.

As illustrated in the drawings (FIG. 1, for example), the elastic protrusion 15 protrudes from a base of the first electrode 10 toward the second electrode 20. In other words, the first electrode 10 has a concave-convex shape having local protrusions extending from the base toward the second electrode 20. The first electrode 10 includes at least one elastic protrusion 15. The pressure sensing element 100 as a whole may include two or more elastic protrusions 15, and one first electrode 10 may have a plurality of elastic protrusions 15. The first electrode 10 has the concave-convex shape on the whole due to the plurality of elastic protrusions 15. Convex portions of the concave-convex shape correspond to the elastic protrusions 15.

An elastic modulus of the first electrode 10, particularly, an elastic modulus of the elastic protrusion 15 is about $10^4$ to $10^8$ Pa, for example, such that the elastic protrusion 15 is gradually deformed by normal pressing force (about 1 N to 10 N, for example) applied to the pressure sensing element 100. The elastic modulus is able to be adjusted through a change in a relative proportion of the conductive filler to the resin component of the resin structure. The resistance of the first electrode 10 may be sufficiently smaller than impedance of the capacitance in a predetermined frequency band. The resistance is also able to be adjusted through a change in a relative proportion of the conductive filler to the resin component of the resin structure.

The elastic protrusion 15 of the first electrode 10 may be tapered. Specifically, the elastic protrusion 15 of the first electrode 10 may be tapered such that the width gradually decreases toward the second electrode 20 (FIG. 1). As illustrated in FIG. 1, the elastic protrusion 15 may have a truncated pyramidal overall shape such as a circular truncated conical shape or a four-sided truncated pyramidal shape, for example. The elastic protrusion 15 having the tapered shape is reliably elastically deformed, resulting in an increase in the contact area between the elastic protrusion 15 and the first dielectric 31.

The height of the elastic protrusion 15 may be any value that allows the elastic protrusion 15 to be elastically deformed. In other words, the height may be any value that allows the elastic protrusion 15 to be elastically deformed by pressure applied from a side adjacent to the top 15' thereof. The elastic protrusions 15 may be regularly arranged. The adjacent elastic protrusions 15 may separate from each other by any distance that allows the elastic protrusions 15 to be elastically deformed and a concave portion (space for the second dielectric 32) to be reliably provided between adjacent elastic protrusions 15.

The second electrode 20 is an electrode facing the first electrode 10. The second electrode 20 may be a layered electrode. The second electrode 20 may be made of any material that has conductive property. The material of the second electrode 20 may be the same as the material of an electrode layer of a common pressure sensing element or a common sensor element, for example. The second electrode 20 may have a higher elastic modulus than the first electrode 10. The elastic modulus of the second electrode 20 is $10^8$ Pa or more, for example. The second electrode 20 may be inelastic, and thus the second electrode 20 may be referred to as an inelastic electrode.

The first dielectric 31 is disposed between the top 15' of the elastic protrusion 15 of the first electrode 10 and the second electrode 20 so as to be in contact with each of them. In other words, the first dielectric 31 is sandwiched between the top 15' (top surface, for example) of the elastic protrusion 15 and the second electrode 20. The first dielectric 31 may be a layered dielectric.

The first dielectric 31 may be made of any material that at least provides properties of the dielectric. The first dielectric 31 may be made of a material including a resin, a ceramic, an oxidized metal, or any combination thereof, for example. The material of the first dielectric 31 may include at least one material selected from the group consisting of a polypropylene resin, a polyethylene terephthalate resin, a polyimide resin, a polyphenylene sulfide resin, aluminum oxide ($Al_2O_3$), and tantalum pentoxide ($Ta_2O_5$), for example.

The first dielectric 31 may have stiffness or elasticity (i.e., the first dielectric 31 changes its shape when external force is applied thereto and returns to its original shape when the external force is released). The first dielectric 31 having elasticity may be referred to as an elastic dielectric or an elastic dielectric layer. The first dielectric 31, which is the elastic dielectric or the elastic dielectric layer, is elastically deformed together with the elastic protrusion 15 of the first electrode 10 upon application of pressure to the pressure sensing element 100. The deformation of both of the first dielectric 31 and the first electrode 10 (particularly, the elastic protrusion 15) allows the second dielectric 32 to deform and become thinner (see, Second Embodiment).

The first dielectric 31 may have a higher elastic modulus than the first electrode 10 (particularly, the elastic protrusion 15) so as to be less deformed than the first electrode 10 (particularly, the elastic protrusion 15) during application of pressure. If the elastic modulus of the first electrode 10 (particularly, the elastic protrusion 15) is about $10^4$ Pa to $10^8$ Pa, the first dielectric 31 may have an elastic modulus higher than about $10^4$ Pa to $10^8$ Pa. Similarly, the first dielectric 31 may have a thickness smaller than a deformation amount of the first electrode 10 (particularly, the elastic protrusion 15) so as to be less deformed than the first electrode 10 (particularly, the elastic protrusion 15) during application of pressure. The first dielectric 31 may include a material having resistance higher than the impedance of the capacitance in a predetermined frequency band. The material (dielectric constant) and the thickness of the first dielectric 31 is selected and determined such that the first dielectric 31 has a dielectric constant and a thickness that allow the first dielectric 31 to have a capacitance per unit area larger than that of the second dielectric 32 before deformation.

The second dielectric 32 is disposed in the concave portion of the first electrode 10, which is defined by the elastic protrusions 15. In other words, the second dielectric 32 is positioned between the adjacent elastic protrusions 15. In other words, as illustrated in FIG. 1, the second dielectric 32 is positioned in a space defined by the upper surface of the protrusion-free portion 17 of the first electrode 10, which does not include the elastic protrusion 15, and the side surfaces of the elastic protrusions 15. The upper surface of the second dielectric 32 may be flush with the top 15' (top surface of the elastic protrusion 15) of the elastic protrusion 15 as illustrated in FIG. 1.

The second dielectric 32 is made of a dielectric material. The dielectric material may be any dielectric material that does not prevent the elastic deformation of the first electrode 10 (particularly, the elastic protrusion 15) and/or the first dielectric 31. The second dielectric 32 may be an air-filled portion. Such configuration allows the elastic protrusion 15 of the first electrode 10 and/or the first dielectric 31 to be reliably deformed, enabling the second dielectric 32 to be deformed to be thinner.

Figure 9A:
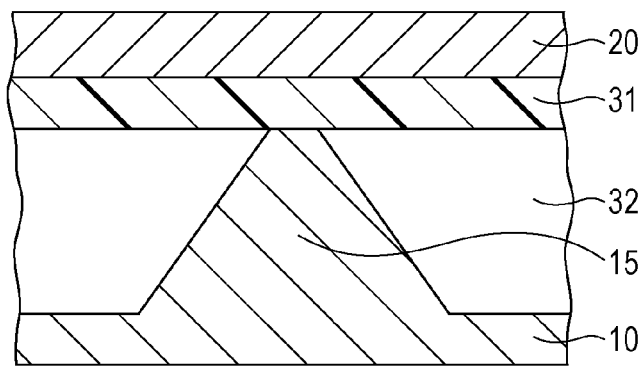
FIG. 9A is a cross-sectional view schematically illustrating a state of the pressure sensing element before application of a load thereto.
Figure 9B:
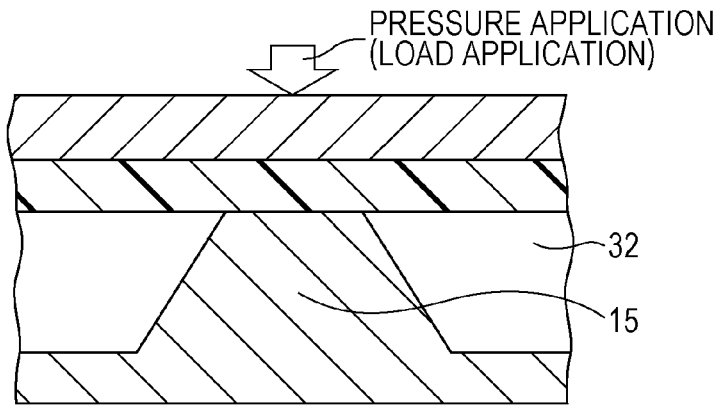
FIG. 9B to FIG. 9D are cross-sectional views each schematically illustrating how the state of the pressure sensing element changes with the passage of time during application of a load thereto.
Figure 9C:
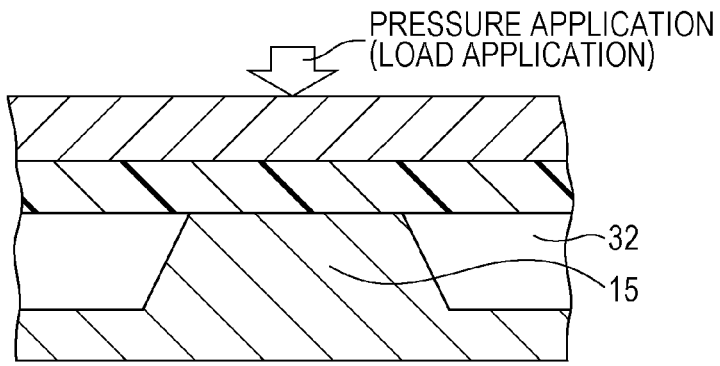
Figure 9D:
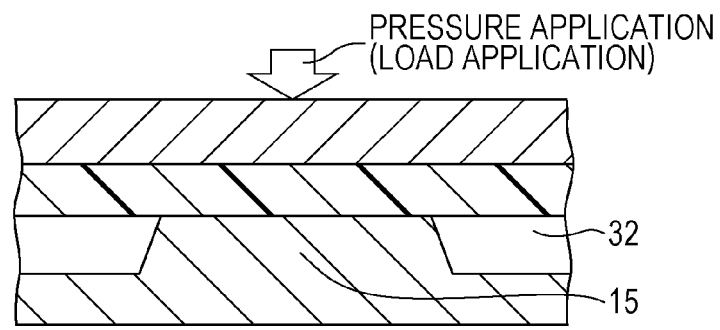

In a preferable aspect of the pressure sensing element 100 of the present disclosure, a pressing side of the pressure sensing element 100 is an outer main surface of the second electrode 20, which faces the first electrode 10. As indicated in FIG. 1, an A side (upper side in FIG. 1) of the pressure sensing element 100, which is opposite a B side (lower side in FIG. 1), is the pressing side. According to the preferable aspect, pressure is applied to the pressure sensing element 100 from the outer main surface of the second electrode 20 toward an inner surface thereof. In other words, the pressure is applied to the pressure sensing element 100 from the A side toward the B side. When the pressure is applied in such a way, the elastic protrusion 15 deforms such that the height thereof gradually decreases and the width thereof gradually increases as illustrated in FIG. 9B to FIG. 9D. As a result, the contact area between the elastic protrusion 15 and the first dielectric 31 increases and the second dielectric 32 deforms and becomes thinner.

As illustrated in FIG. 4B and FIG. 4C, when the load is applied to the pressure sensing element 100 from the pressing side, the contact area between the elastic protrusion 15 (particularly, the top 15' thereof) of the first electrode 10 and the first dielectric 31 increases due to the deformation of the elastic protrusion 15. This causes a change in the capacitance of the first capacitor. In other words, the first capacitor exhibits the capacitance characteristic (correlation between the load and the first capacitance). As illustrated in FIG. 5B and FIG. 5C, when the load is applied to the pressure sensing element 100 from the pressing side, the second dielectric 32 deforms and becomes thinner. This causes a change in the capacitance of the second capacitor. In other words, the second capacitor exhibits the capacitance characteristic (correlation between the load and the second capacitance). The pressure sensing element 100 of the present disclosure uses a combination of the capacitance characteristic of the first capacitor and the capacitance characteristic of the second capacitor. The combination enables the pressure sensing element 100 to have an improved linearity in the capacitance change characteristic (capacitance change characteristic during application of a load).

The detection of the change in capacitance may be operated in either of a self-capacitance mode and a mutual capacitance mode. Alternatively, any other known mode may be employed to detect the change in capacitance. Any proper mode may be employed according to usage of the pressure sensing element 100. In addition, any known method may be employed to derive the load from the change in the capacitance of the pressure sensing element 100.

The pressure sensing element 100 may be used together with a controller. The controller may be configured to store changes in the capacitance of the pressure sensing element 100 or store a distribution of the derived load. Alternatively, the controller may be configured to output such changes or a distribution of the derived load. The controller may be disposed separately from the pressure sensing element 100, and the pressure sensing element 100 may be controlled by an external arithmetic processing unit such as a personal computer (PC).

Figure 10:
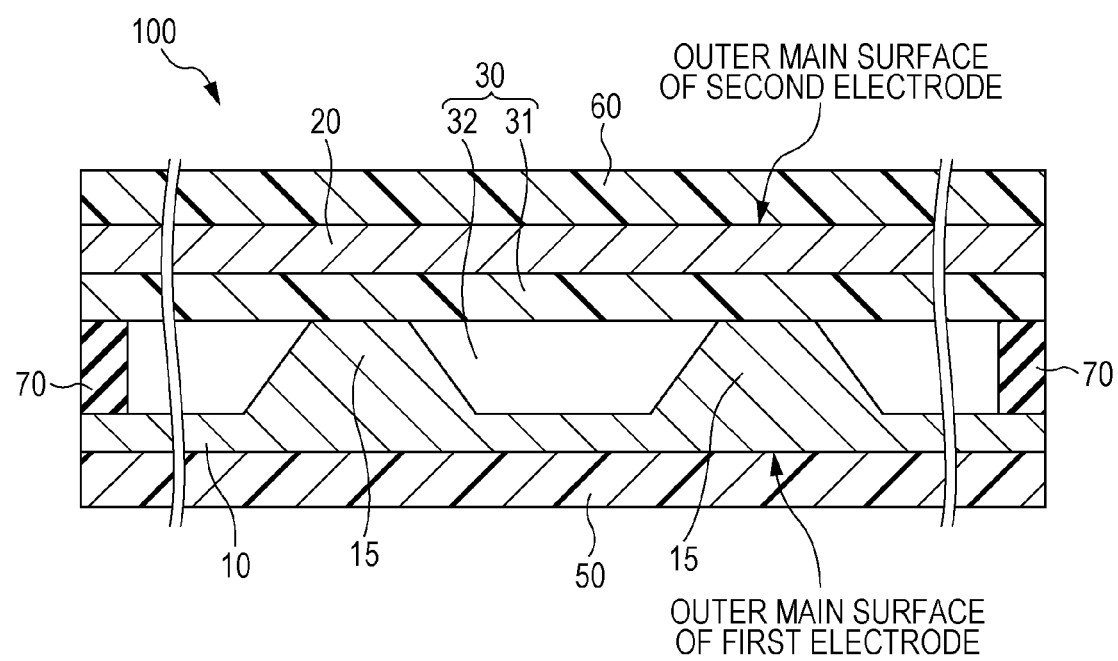
FIG. 10 is a cross-sectional view schematically illustrating a pressure sensing element further including a supporting member, a pressing member, and a spacer.

As illustrated in FIG. 10, an aspect of the present disclosure further includes a supporting member 50 and a pressing member 60. As illustrated, the supporting member 50 and the pressing member 60 are disposed on respective sides of a structure including the first electrode 10, the second electrode 20, and the dielectric 30.

As illustrated in FIG. 10, the supporting member 50 is in contact with an outer main surface of the first electrode 10. The supporting member 50 at least supports the structure including the first electrode 10, the second electrode 20, and the dielectric 30. The supporting member 50 may have flexibility. The supporting member 50 may be a resin board and may include at least one resin component selected from the group consisting of polyethylene terephthalate, polycarbonate, and polyimide, for example.

As illustrated in FIG. 10, the pressing member 60 is in contact with the outer main surface of the second electrode 20. The pressing member 60 directly receives the pressure to be applied to the structure including the first electrode 10, the second electrode 20, and the dielectric 30. The pressing member 60 may have flexibility. The pressing member 90 may be a resin board and may include at least one resin component selected from the group consisting of polyethylene terephthalate, polycarbonate, and polyimide, for example.

The pressure sensing element 100 of the present disclosure may further include a spacer 70. Specifically, as illustrated in FIG. 10, the spacer 70 may be disposed between the first electrode 10 and the second electrode 20 facing each other. As illustrated, the spacer 70 may be disposed on a peripheral portion of each of the first electrode 10 and the second electrode 20. The spacer 70 reliably allows the first electrode 10 and the second electrode 20 to face each other. In addition, the spacer 70 reliably allows the elastic protrusion 15 to be elastically deformed during application of pressure and allows the second dielectric 32 to deform to be thinner and to return to its original shape. The spacer 70 may include an insulating resin (such as a polyester resin, an epoxy resin, or a combination thereof, for example). Alternatively, the elastic protrusion 15 of the first electrode 10 may be used as a spacer.

The pressure sensing element 100 of the present disclosure may be embodied in various ways. Hereinafter, various embodiments of the pressure sensing element 100 are described.

Second Embodiment

Figure 11A:
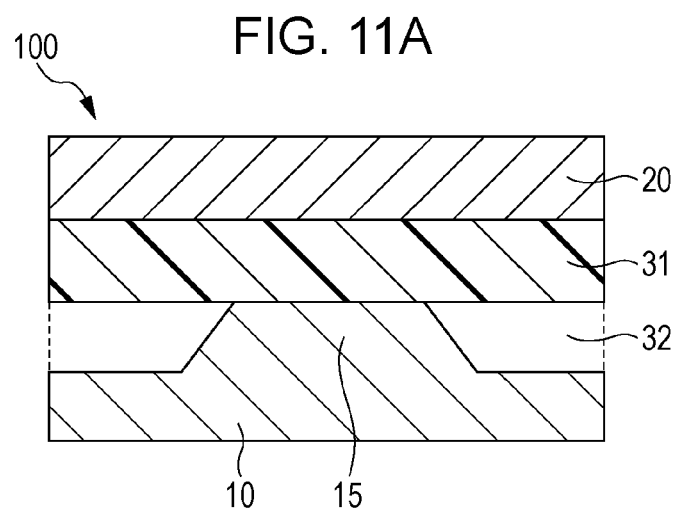
FIGS. 11A and 11B are cross-sectional views for describing a pressure sensing element according to a second embodiment.
Figure 11B:
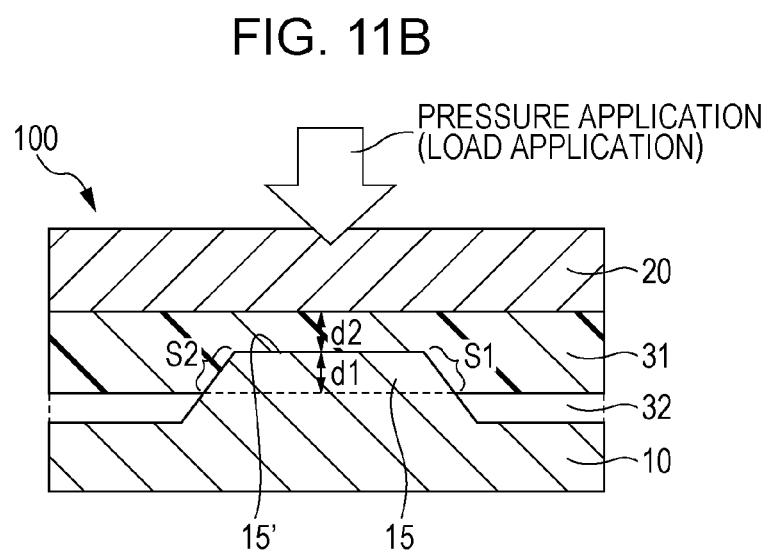

As illustrated in FIG. 11A and FIG. 11B, the first dielectric 31 is subjected to local elastic deformation during application of pressure.

Specifically, as illustrated in FIG. 11A and FIG. 11B, when a load is applied to the pressure sensing element 100 from the pressing side, the first dielectric 31 deforms such that at least a portion of the elastic protrusion 15 penetrates into the first dielectric 31. The elastic protrusion 15 deforms at the same time. This configuration may provide advantageous effects such as an increase in the capacitance detected in the high-load application section based on the following reasons.

(1) The contact area between the elastic protrusion 15 and the first dielectric 31 during application of pressure increases by an area corresponding to the penetrated portion. Specifically, the contact area increases by an area corresponding to contact surfaces S1 and S2 indicated in FIG. 11B.

(2) The thickness of the second dielectric 32 largely decreases due to the penetration. Specifically, the thickness of the second dielectric 32 decreases by a thickness corresponding to the penetrated portion of the elastic protrusion 15 (indicated by d1 in FIG. 11B).

(3) The thickness of the first dielectric 31 decreases due to the penetration. Specifically, the distance between the top 15' of the elastic protrusion 15 and the second electrode 20 decreases to a distance d2 indicated in FIG. 11B due to the penetration.

In this embodiment, the capacitance detected during high-load application increases, and thus high linearity of the pressure sensing element 100 is achieved. In other words, a ratio of the first capacitance, in which the capacitance detected during high-load application is increased, to the second capacitance (relationship of the correlation between the load and the first capacitance of the first capacitor and the correlation between the load and the second capacitance of the second capacitor) is appropriately adjusted to obtain a pressure sensing element having high linearity.

As can be understood from the embodiment illustrated in FIGS. 11A and 11B, since the first dielectric 31 is locally deformed by the elastic protrusion 15 during application of the pressure, the load applied to the elastic protrusion 15 during application of pressure is reduced. According to this embodiment, the elastic protrusion 15 of the pressure sensing element 100, which is repeatedly used, is able to have a longer service life.

Embodiment of Light Transmissive Pressure Sensing Element

The pressure sensing element 100 according to this embodiment is a transparent pressure sensing element. In this embodiment, at least one selected from the group of the first electrode 10, the second electrode 20, the first dielectric 31, and the second dielectric 32 has light transmissivity. In other words, at least one of the components of the pressure sensing element 100 is transparent in a visible light range.

All of the components of the pressure sensing element 100 may be transparent. Each of the first electrode 10, the second electrode 20, the first dielectric 31, and the second dielectric 32 may have light transmissivity. In addition, the supporting member 50 and the pressing member 60 may also have light transmissivity.

The above-described components of the pressure sensing element 100 include the following material, for example, to have transparency. The supporting member 50 and the pressing member 60 may include a transparent resin material such as polyethylene terephthalate, polycarbonate, or a combination thereof, for example.

The first electrode 10 may be made of a resin structure and a conductive filler dispersed in the resin structure. In such a case, the resin structure may include at least one highly transparent resin material selected from the group consisting of a silicone resin, a styrene resin, an acrylic resin such as polymethyl methacrylate, and a rotaxane resin. The conductive filler may be made of nanoparticles including indium (III) oxide ($In_2O_3$), zinc oxide (ZnO), tin (IV) oxide ($SnO_2$), or any combination thereof, for example. Alternatively, the conductive filler may be made of a nanowire made of gold (Au), silver (Ag), copper (Cu), carbon (C), or any combination thereof, for example. The nanowire may have a diameter of a few tens of nanometers (nm). The first electrode 10 made of such a resin structure and a conductive filler has the transparency. In the first electrode 10, a transparent conductive ink such as indium (III) oxide ($In_2O_3$) may be applied to the surface of the resin structure to form a transparent conductive layer instead of the conductive filler. In addition, the resin structure may have a conductive grid pattern, which is made of silver (Ag) or copper (Cu), for example, on the surface. The conductive grid pattern may include lines each having a width of a few hundred nanometers (nm) and may have a pitch of a few tens of micrometers (μm).

The second electrode 20 may be a transparent electrode layer. The second electrode 20 may include a transparent electrode material including indium (III) oxide ($In_2O_3$), zinc oxide (ZnO), tin (IV) oxide ($SnO_2$), or any combination thereof, for example.

The first dielectric 31 may be a transparent dielectric layer. The first dielectric 31 may include a transparent dielectric material such as a polyethylene terephthalate resin, a polyimide resin, or a combination thereof, for example.

The second dielectric 32 may be an air layer. The second dielectric 32 that is the air layer reliably has light transmissivity.

Embodiment of Matrix Sensors

This embodiment includes a plurality of pressure sensing elements 100 as sensor elements in a matrix.

In this embodiment, a position of load application in a detection surface of a sensor device including the pressure sensing elements 100 is able to be determined based on a change in capacitance of a capacitance detection portion. Specifically, the sensor device includes a plurality of second electrodes arranged along the detection surface, first electrodes facing the second electrodes, and a plurality of capacitance detection portions each defined by a pair of the second electrode and the first electrode. In this embodiment, the first electrodes adjacent to each other in a predetermined direction may be electrically connected to each other. The second electrodes may be electrically connected to each other and/or the first electrodes may be electrically connected to each other.

Method of Producing Pressure Sensing Element

A method of producing the pressure sensing element 100 of the present disclosure is described. FIG. 12A to FIG. 12F indicate an outline of steps in a method of producing the pressure sensing element 100 according to one of embodiments.

Step of Providing Supporting Member

Figure 12A:
FIG. 12A to FIG. 12F are cross-sectional views each schematically illustrating a step of producing the pressure sensing element of the present disclosure.

As illustrated in FIG. 12A, the supporting member 50 is provided. The supporting member 50 may be a flexible board. The supporting member 50 may be a plastic board including polyethylene terephthalate, polycarbonate, polyimide, or any combination thereof, for example.

Step of Forming First Electrode

Then, a composite material including a liquid polymer resin material including a conductive filler is applied to the supporting member 50. The liquid polymer resin material may be a urethane resin, a silicone resin, a styrene resin, an acrylic resin, a rotaxane resin, or any combination thereof, for example. The conductive filler may be at least one material selected from the group consisting of gold (Au), silver (Ag), copper (Cu), carbon (C), zinc oxide (ZnO), indium (Ill) oxide ($In_2O_3$), and tin (IV) oxide ($SnO_2$), for example.

Figure 12B:
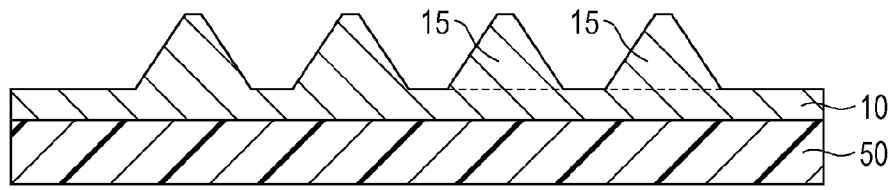

Then, a mold having a concave-convex pattern is pressed against the composite material layer on the supporting member 50. Then, the composite material layer is cured. As a result, the first electrode 10 having the elastic protrusions 15 is formed (FIG. 12B). Specifically, the concave-convex pattern of the mold is transferred to the composite material layer, so that a plurality of pillar-like protrusions (elastic protrusions 15) are formed. The pillar-like protrusions may have any shape (such as a cylindrical shape, a conical shape, a circular truncated conical shape, a four-sided truncated pyramidal shape, a semispherical shape, or a lattice shape) in accordance with the shape of the concave-convex pattern of the mold.

The first electrode 10 may be formed without the composite material including the conductive filler. A liquid polymer resin material may be applied to the supporting member 50 to form a resin material layer. The concave-convex pattern is transferred to the resin material layer to form a resin structure. Then, an ink including a conductive filler may be applied to the surface of the resin structure to form a conductive layer, for example.

Such a method of forming the first electrode 10 employs a nanoimprint technology. Specifically, the mold having a concave-convex pattern is pressed against the resin body, which is a transfer target, such that a nano-sized pattern of a mold is transferred to a resin body. Such a technology is able to reliably form a fine pattern and a three-dimensional shape having a tapered surface such as a conical shape compared with lithography. The nanoimprint technology is able to readily control the overall shape of the first electrode 10 and the height of the protrusion by using the mold having a predetermined concave-convex pattern. The nanoimprint technology is also able to control the shape of the protrusion. The change in the contact area between the elastic protrusion 15 and the first dielectric layer 31 in the pressure sensing element 100 (change in the contact area during application of pressure) is allowed to be gentle by controlling the shape of the protrusion. The change in capacitance during application of pressure is able to be appropriately controlled, and thus the pressure sensing element 100 that detects the pressure with high accuracy is obtained.

The first electrode 10 may be formed by a technology other than the nanoimprint technology such as a photolithography and etching technology or a developing and removing technology. In photolithography and etching, a desired height and a desired shape of the protrusion 15 are obtained through control of the concentration and flow rate of an etching liquid.

Step of Forming Spacer

Figure 12C:
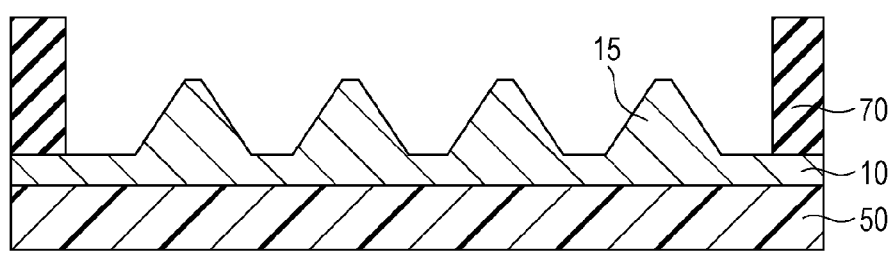

Then, as illustrated in FIG. 12C, the spacer 70 is formed. As illustrated, the spacer 70 may be positioned on a periphery of an assembly including the supporting member 50 and the first electrode 10. The spacer 70 may be formed of an insulating resin material such as a polyester resin, an epoxy resin, or a combination thereof, for example. Alternatively, the elastic protrusion 15 of the first electrode 10 may be used as a spacer.

Step of Forming Second Electrode

Figure 12D:
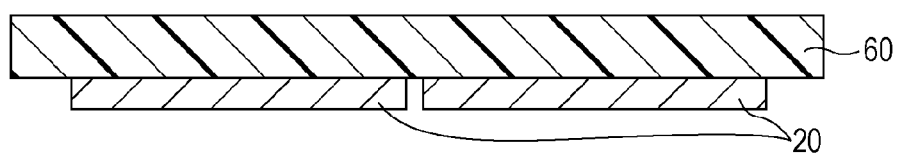

Then, as illustrated in FIG. 12D, a plurality of second electrodes 20 are formed on the pressing member 60. Specifically, the second electrodes 20 are separate from each other on a flexible plastic board formed of a resin material, which is used as the pressing member 60. The resin material of the pressing member 60 may be polyethylene terephthalate, polycarbonate, polyimide, or any combination thereof, for example.

The method of forming the second electrode 20 is not limited. A composite material including a liquid polymer resin material containing a conductive filler therein may be printed in a pattern on the pressing member 60 and cured to form the second electrode 20. The polymer resin material may be a silicone resin, a styrene resin, an acrylic resin, a rotaxane resin, or any combination thereof, for example. The conductive filler may be at least one material selected from the group consisting of gold (Au), silver (Ag), copper (Cu), carbon (C), zinc oxide (ZnO), indium (III) oxide ($In_2O_3$), and tin (IV) oxide ($SnO_2$), for example. Alternatively, the second electrode 20 may be formed by an electroless plating process or a sol-gel process.

Step of Forming First Dielectric

Figure 12E:
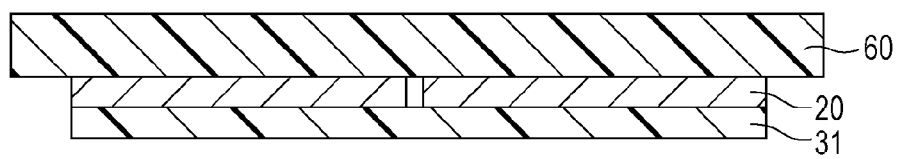

Then, as illustrated in FIG. 12E, the first dielectric 31 is formed. Specifically, the first dielectric 31 is formed on the second electrode 20. A resin material is applied to a surface of the second electrode 20 to form the first electrode 31, for example. The resin material of the first dielectric 31 may include at least one material selected from the group consisting of a polypropylene resin, a polyethylene terephthalate resin, a polyimide resin, a polyphenylene sulfide resin, aluminum oxide ($Al_2O_3$), and tantalum oxide ($Ta_2O_5$), for example.

Step of Disposing Pressing Member

Figure 12F:
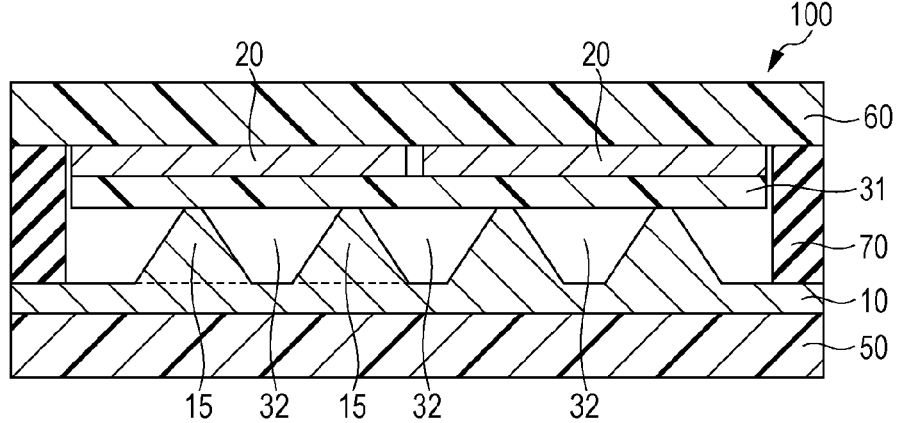

Then, the pressing member 60 is disposed on the assembly including the supporting member 50 and the first electrode 10. Specifically, as illustrated in FIG. 12F, the pressing member 60 having the second electrode 20 and the first dielectric 31 thereon is disposed on the assembly including the supporting member 50 and the first electrode 10 with the spacer 70 being disposed therebetween. Particularly, the first dielectric 31 is positioned so as to directly face the first electrode 10. A space defined by the first dielectric 31 and the first electrode 10 is the second dielectric 32.

The pressure sensing element 100 as illustrated in FIG. 12F is obtained by the above steps.

The embodiments of the present disclosure have been described above. However, the present disclosure is not limited to the above description. As is readily appreciated by a person skilled in the art, various modification may be applied to the above-described embodiments.

Figure 13A:
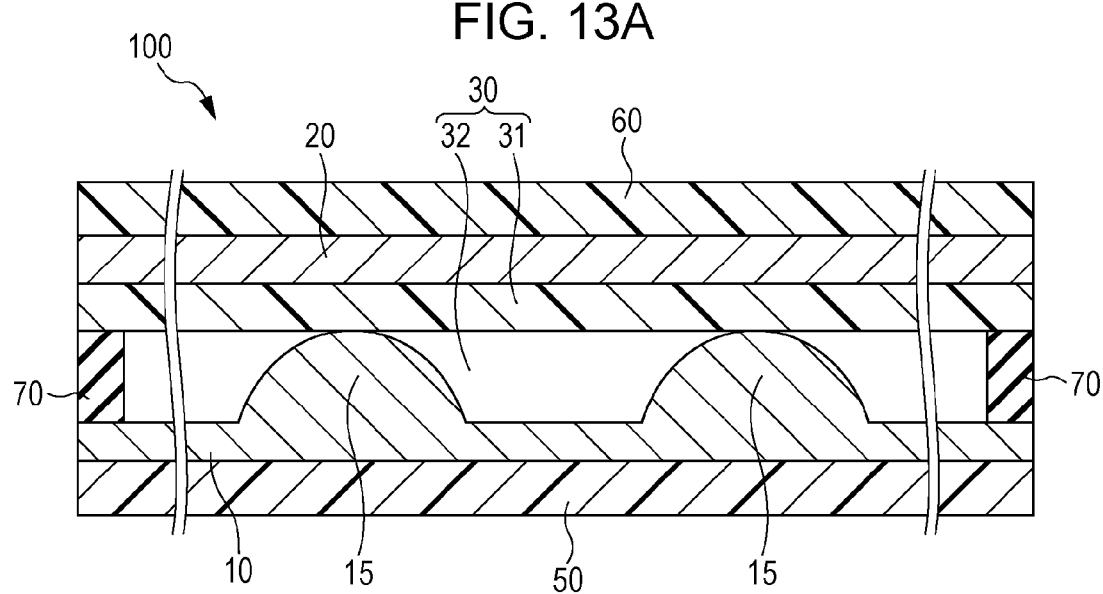
FIG. 13A to FIG. 13D are cross-sectional views each schematically illustrating a pressure sensing element including an elastic protrusion having a semispherical shape according to one aspect of the present disclosure.
Figure 13B:
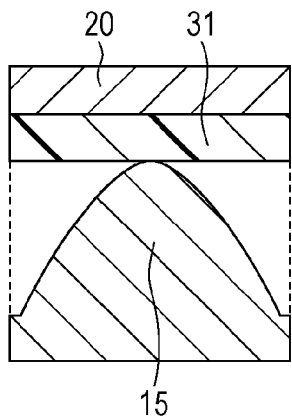
Figure 13C:
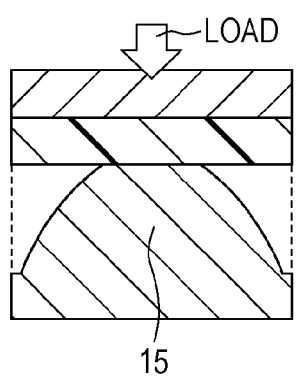
Figure 13D:
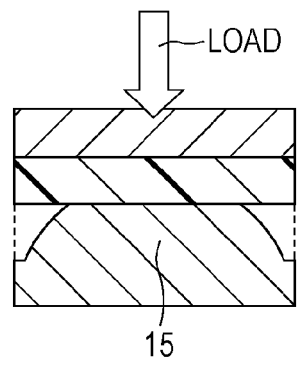

In the above-described embodiment, the elastic protrusion 15 has a truncated pyramidal shape (such as a circular truncated conical shape or a four-sided truncated pyramidal shape). However, the present disclosure is not limited thereto. In the pressure sensing element 100 of the present disclosure, as illustrated in FIG. 13A, the elastic protrusion 15 may have a semispherical shape. In other words, an outline of a cross section of the elastic protrusion 15 (taken along a line extending in the thickness direction of the pressure sensing element 100) may include at least one curved portion. As illustrated in FIG. 13B to FIG. 13D, such a configuration allows the elastic protrusion 15 to deform such that the contact area between the elastic protrusion 15 and the first dielectric 31 increases and the second dielectric 32 decreases to be thinner.

Advantages of the present disclosure sought by the inventors are additionally described. The gist of the present disclosure is to control the linearity during low-load application and high-load application through the use of the elastic dielectric (the first dielectric having elasticity), which allows effective use of a change in the capacitance of a deformable dielectric (the second dielectric). The capacitance of the deformable dielectric is inversely proportional to the thickness of the dielectric. The change in the capacitance is small during application of a low load and is large during application of a high load. Thus, the change in the capacitance of the deformable dielectric has a characteristic opposite to the change in the capacitance caused by the change in the contact area (contact area between the elastic protrusion of the first electrode and the first dielectric). In the present disclosure, the linearity during application of the low load and during application of the high load is controlled by actively using the deformable dielectric.

The elastic electrode (the elastic protrusion of the first electrode) is less likely to be deformed by application of a high load since the pressure is dispersed due to the large contact area. Thus, the change in the thickness of the deformable dielectric is small, resulting in a small increase in the capacitance during application of the high load. To solve the problem, the present disclosure uses the elastic dielectric (first dielectric having elasticity) so as to deform and cover the pressed protrusion (elastic protrusion) during application of pressure. This leads to an increase in the contact area between the elastic electrode and the elastic dielectric (contact area between the elastic protrusion of the first electrode and the first dielectric), a decrease in the thickness of the deformable dielectric, and a decrease in the thickness of the elastic dielectric, for example. As a result, a high change rate in the capacitance is also obtained in the high-load application section.

In the present disclosure, the high linearity of the pressure sensing element is obtained through detection of two kinds of the capacitance for sensing. Specifically, the pressure sensing element obtains the high linearity through detection of the total capacitance including the capacitance between the protrusion (elastic protrusion) of the first electrode and the second electrode and the capacitance at the deformable dielectric (second dielectric) for sensing.

What is claimed is:

1. A pressure sensing element comprising:
a first electrode including at least one protrusion having elasticity;
a second electrode facing the at least one protrusion;
a dielectric disposed between the first electrode and the second electrode and including a first dielectric and a second dielectric, and
a spacer disposed between the first electrode and the second electrode;
wherein the first dielectric is disposed between a top of the at least one protrusion and the second electrode, and is in contact with each of the top of the at least one protrusion and the second electrode without application of a load,
the second dielectric is disposed between a first portion of the first electrode, the first portion not including the at least one protrusion, and the first dielectric, and
the spacer is disposed only on a peripheral portion of each of the first electrode and the second electrode, and the spacer directly contacts the first portion of the first electrode.

2. The pressure sensing element according to claim 1, wherein the pressure sensing element has a capacitance including a first capacitance and a second capacitance,
the first capacitance is a capacitance of a first capacitor including a contact area between the at least one protrusion and the first dielectric, and
the second capacitance is a capacitance of a second capacitor including a contact area between the first dielectric and the second dielectric.

3. The pressure sensing element according to claim 2, wherein a capacitance characteristic of the pressure sensing element has higher linearity than a capacitance characteristic of the first capacitance and a capacitance characteristic of the second capacitance.

4. The pressure sensing element according to claim 2, wherein the first capacitor includes the at least one protrusion, a first section of the second electrode facing the at least one protrusion, and a first section of the first dielectric positioned between the at least one protrusion and the first section of the second electrode, and
the second capacitor includes the first portion of the first electrode, a second section of the second electrode facing the first portion of the first electrode, a second section of the first dielectric positioned between the first portion of the first electrode and the second section of the second electrode, and the second dielectric.

5. The pressure sensing element according to claim 1, wherein the at least one protrusion has a tapered shape in which a width of the tapered shape gradually decreases toward the second electrode.

6. The pressure sensing element according to claim 1, wherein the at least one protrusion and the second dielectric are configured such that the second dielectric deforms when the at least one protrusion deforms.

7. The pressure sensing element according to claim 1, wherein
the second electrode has a first main surface facing the first electrode and a second main surface opposite the first main surface, and
the at least one protrusion is configured such that a contact area between the at least one protrusion and the first dielectric increases due to deformation of the at least one protrusion caused by an application of a load to the second main surface.

8. The pressure sensing element according to claim 1, wherein
the second electrode has a first main surface facing the first electrode and a second main surface opposite the first main surface, and
the at least one protrusion is configured such that a thickness of the second dielectric decreases due to deformation of the second dielectric caused by an application of a load to the second main surface.

9. The pressure sensing element according to claim 1, wherein the first dielectric has elasticity.

10. The pressure sensing element according to claim 1, wherein the second electrode has a first main surface facing the first electrode and a second main surface opposite the first main surface, and the at least one protrusion and the first dielectric are configured such that the at least one protrusion and the first dielectric are both deformed when a load is applied to the second main surface.

11. The pressure sensing element according to claim 1, wherein the first dielectric has a higher elastic modulus than the at least one protrusion.

12. The pressure sensing element according to claim 1, wherein at least one selected from the group consisting of the first electrode, the second electrode, the first dielectric, and the second dielectric has light transmissivity.

13. The pressure sensing element according to claim 1, further comprising a supporting member and a pressing member, wherein the second electrode has a first main surface facing the first electrode and a second main surface opposite the first main surface, the first electrode has a third main surface facing the second electrode and a fourth main surface opposite the third main surface, the supporting member is in contact with the fourth main surface, and the pressing member is in contact with the second main surface.

14. The pressure sensing element according to claim 1, wherein the spacer includes an insulating resin.

15. The pressure sensing element according to claim 1, wherein the spacer is disposed between the first portion of the first electrode and the first dielectric.

* * * * *